June 20, 1972  E. B. JOHNSON  3,671,222

SILVER RECOVERY FROM PHOTOGRAPHIC WASTES

Filed Nov. 24, 1969  2 Sheets-Sheet 1

INVENTOR
EDWARD B. JOHNSON

BY *Michael W. York*

ATTORNEY

United States Patent Office 3,671,222
Patented June 20, 1972

3,671,222
SILVER RECOVERY FROM PHOTOGRAPHIC WASTES
Edward B. Johnson, 4654 34th St. N.,
Arlington, Va. 22207
Filed Nov. 24, 1969, Ser. No. 879,144
Int. Cl. C22b 11/02, 7/00
U.S. Cl. 75—83          2 Claims

ABSTRACT OF THE DISCLOSURE

A method for the rendering of silver from photographic waste in which the film or other waste is ignited and brought up to a satisfactory burning temperature in a primary chamber and maintained at this temperature until the film or waste is burned by controlling the amount of oxygen supplied to the primary chamber. The burning of the photographic waste is controlled so that the temperature of the gases and particulate matter resulting from the burning of the photographic waste is above about 1200° F. and below about 1500° F. as the gases and particulate matter are about to leave the primary chamber. During the ignition and burning of the photographic waste the smoke and particulate matter is directed to a secondary chamber where it is subjected to burning at a temperature that is higher than that in the primary chamber. After the photographic waste is burned, the silver bearing ash is cooled and removed from the primary chamber. The ash is then processed by conventional techniques to refine the silver. This method permits the economical rendering of silver from photographic waste by burning with the elimination or reduction of smoke and other air pollutants.

DISCLOSURE

This invention relates to a method for the rendering of silver from photographic waste and more particularly to a method that permits the rendering of silver from photographic waste by burning with a minimum amount of air pollution.

The recovery of silver is important since there is a growing demand for silver in the United States that currently exceeds the amount of new silver that is being mined. A large amount of available silver is used in the manufacture of film and consequently various methods have been developed to render this silver from used film and other photographic waste products. The chemical methods that have been used to render silver from photographic waste have included the treating of the photographic waste with an oxidizing agent. In this method chemicals are used to strip the silver-bearing emulsion from photographic film. A disadvantage of this method is that it is not an efficient and economic method for recovering the small amount of silver that is present in large quantities of used film and other such photographic wastes. These chemical methods of rendering silver from photographic wastes also usually create residual liquid contaminants and do not reduce the volume and weight of the photographic wastes.

The burning of photographic film has also been used as a method of rendering the silver present in such wastes. Unfortunately, if the photographic wastes such as used film and the like are permitted to burn under uncontrolled conditions, the temperature of the burning wastes may rise to the point where a substantial portion of the silver is lost with the smoke that is generated during burning. In addition, the uncontrolled burning of photographic wastes results in smoke and particulate air pollutants that are undesirable.

The method of this invention overcomes these disadvantages and permits the efficient and economical rendering of silver from photographic wastes by burning with a low loss in silver and a reduction in air pollutants. With the method of this invention the resulting ash is also readily available for further treatment to purify the silver from the ash.

It is therefore an object of the present invention to provide a method that permits the efficient and economical rendering of silver from photographic waste.

It is also an object of this invention to provide a method that permits the rendering of silver from photographic waste.

It is also an object of this invention to provide a method that permits the rendering of silver from photographic waste by burning with a minimum of air pollution.

Another object of this invention is to provide a method that permits the silver-bearing ash that is recovered after burning the photographic wastes to be readily treated to recover the silver.

The present invention provides a method of rendering silver from photographic wastes comprising the steps of igniting the photographic wastes in a first confined area, controlling the burning of said photographic wastes in the first confined area so that the temperature of the resulting gases and particulate matter is below about 1500° F. and above about 1200° F. as the gases and particulate matter are about to leave the first confined area, directing the gases and particulate matter to a second confined area, subjecting the gases and particulate matter in the second confined area to burning at a temperature above about 2000° F., and removing the remaining silver and silver bearing ash from the first confined area after the photographic wastes have been burned.

In order that the invention may be more clearly set forth and better understood, reference is made to the drawings in which.

Figure 1:
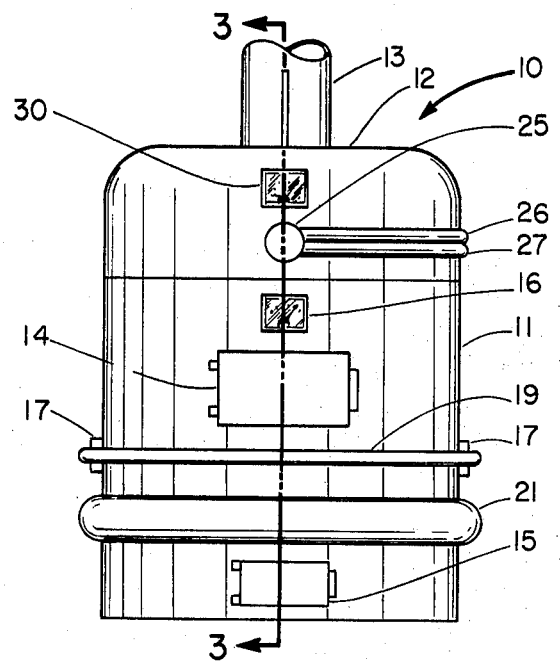
FIG. 1 is a front elevational view of a silver rendering apparatus that is capable of carrying out the method of the invention.
Figure 2:
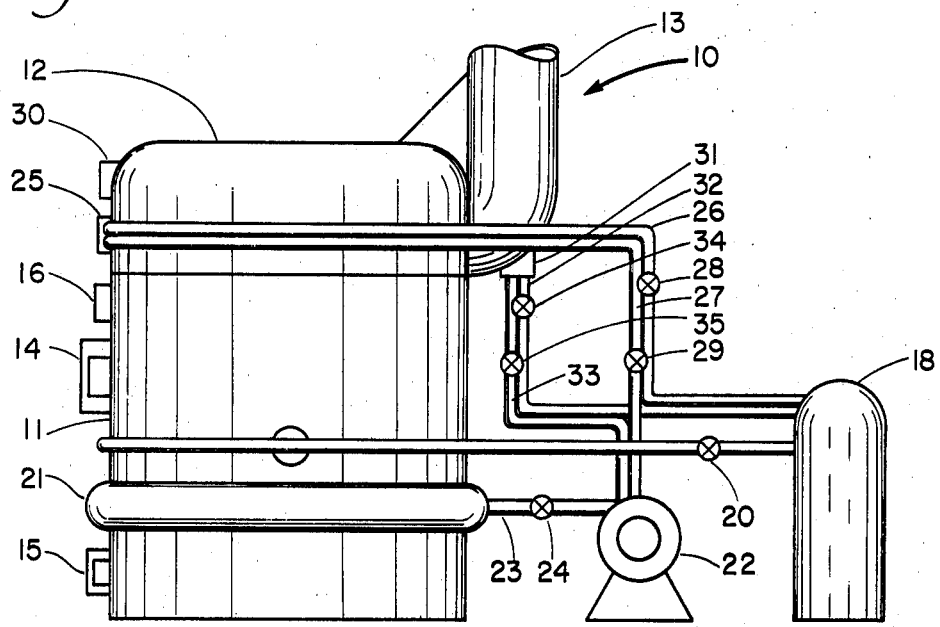
FIG. 2 is a side elevational view of the silver rendering apparatus shown in FIG. 1.

Referring to the figures, a silver rendering apparatus 10 is shown that includes a cylindrical primary chamber 11 for receiving and burning photographic wastes and a secondary chamber 12 for burning gases and particulate matter resulting from the burning of the photographic wastes in the primary chamber that is located above and connected to the primary chamber. Attached to the secondary chamber 12 is an exhaust stack 13 for receiving and transporting gases and any particulate matter from the secondary chamber 12. A loading door 14 is located on the front of primary chamber 11 that can be opened to permit the primary chamber to be loaded with photographic wastes. Located on the front of the primary chamber 11 below the loading door 14 is an ash removal door 15 that can be opened to permit the removal of silver-bearing ash that remains after the photographic wastes are burned. A pyrometer 16 is located on the front of the primary chamber 11 for indicating the temperature within the primary chamber. Primary chamber burners 17 for igniting photographic wastes that have been placed in the primary chamber are located on the sides of and are connected to the primary chamber 11 and these burners are connected to a fuel supply 18 by a fuel supply line 19 that has a fuel control valve 20 for controlling the supply of fuel to the primary chamber burners. An air supply conduit 21 is located around the exterior of the primary chamber 11 below the primary chamber burners 17 and is connected to an air blower 22 by an air supply line 23 that has an air control valve 24 for controlling the flow of air to the air supply conduit.

A secondary chamber burner 25 is located on the front of and is connected to the secondary chamber 12 for causing the burning or oxidizing of the gases and particulate matter in the secondary chamber that result from the burning of the photographic wastes in the primary chamber 11. The secondary chamber burner 25 is connected to the fuel supply 18 and the air blower 22 by a fuel supply line 26 and an air supply line 27 that have respectively a fuel supply valve 28 and an air supply valve 29 for controlling the amount of air and fuel supplied to the secondary chamber burner. A secondary chamber pyrometer 30 is located on the front of the secondary chamber above the secondary burner 25 for indicating the temperature within the secondary chamber. The exhaust stack 13 has an exhaust stack burner 31 that is located near the lower end of the exhaust stack for burning any unoxidized particulate matter or gases that enter the exhaust stack from the secondary chamber. The exhaust stack burner 31 is connected to the fuel supply 18 by a fuel supply line 32 and an air supply line 33 that have respectively a fuel supply valve 34 and an air supply valve 35 for controlling the supply of fuel and air to the exhaust stack burner.

Figure 3:
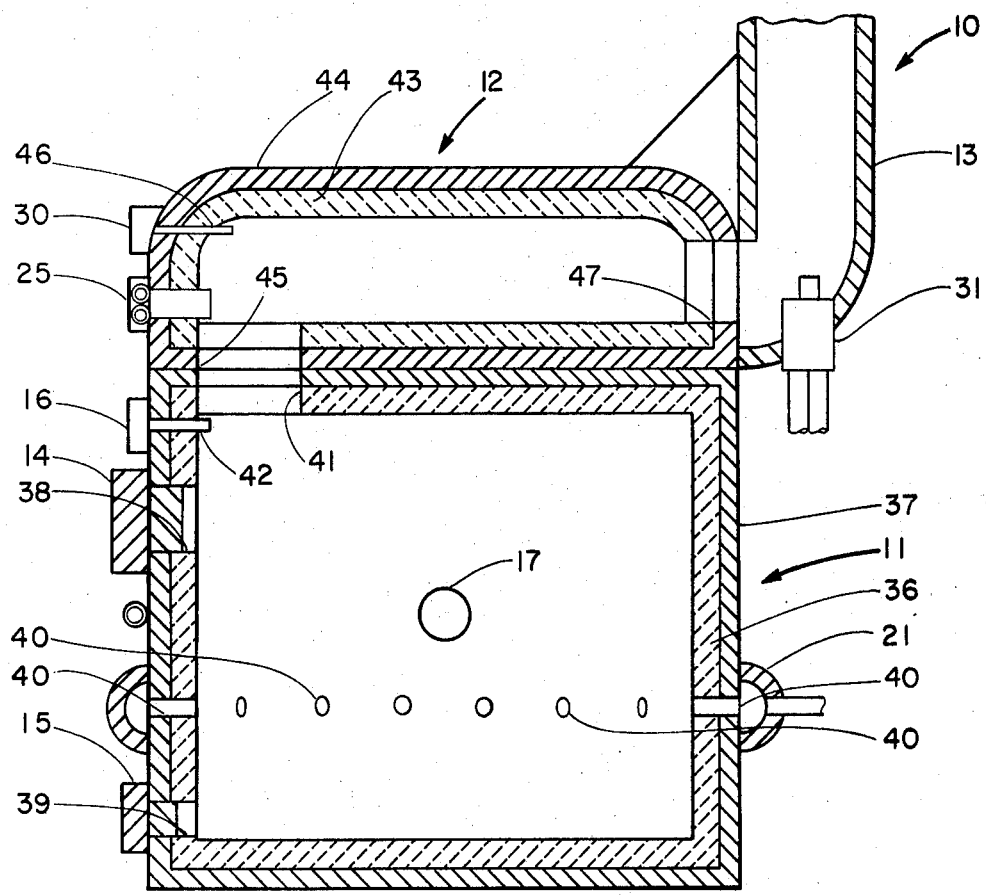
FIG. 3 is a cross-sectional view of the silver rendering apparatus shown in FIG. 1 taken substantially along the line 3—3 thereof.

The interior of the silver rendering apparatus is illustrated in FIG. 3. The primary chamber 11 has an inner refractory lining 36 that is attached to a surrounding steel shell 37. The primary chamber 11 has a loading port 38 that extends through the steel shell 37 and the refractory lining 36 that permits photographic wastes to be placed within the primary chamber when the loading door 14 is open. The primary chamber 11 also has an ash removal port 39 that extends through the steel shell 37 and the refractory lining 36 below the loading port 38 for removing silver-bearing ash from the primary chamber after the ash removal door 15 is opened. Tuyere air holes 40 extend from the interior of primary chamber 11 through the refractory lining 36 and the steel shell 37 to the air supply conduit 21 that surrounds the primary chamber and permit air in the supply conduit to enter the primary chamber. The primary chamber 11 has a primary chamber exhaust port 41 for exhausting gases and particulate matter resulting from the burning of the photographic wastes in the primary chamber that is located in the top of the primary chamber near the loading port 38 and extends through the refractory lining 36 and the steel shell 37. A temperature sensor 42 for sensing the temperature within the primary chamber near the outlet port is located in the primary chamber above the loading port 38 and near the primary chamber outlet port 41 and is connected to the primary chamber pyrometer 16.

The secondary chamber 12 that is located above the primary chamber 11 has an inner refractory lining 43 that is attached to a surrounding steel shell 44. The secondary chamber 12 has an inlet port 45 for receiving gases and particulate matter that are exhausted from the primary chamber exhaust port that is located on the bottom of the secondary chamber near the front of the secondary chamber and extends through the refractory lining 43 and the steel shell 44. The inlet port 45 of the secondary chamber 12 is located above and is connected to the primary chamber exhaust port 41 so that the gases and particulate matter that exit from the primary chamber 11 through the primary chamber outlet port pass through the secondary chamber inlet port and into the secondary chamber. The secondary burner 25 is located on the front of the secondary chamber 12 just above the secondary chamber inlet port 45 so that the gases and particulate matter that enter the secondary chamber come in close contact with the flame produced by the secondary burner. A temperature sensor 46 for sensing the temperature within the secondary chamber 12 is located above the secondary burner 25 in the secondary chamber and is connected to the secondary chamber pyrometer 30. The secondary chamber 12 has a secondary chamber exhaust port 47 for exhausting gases and particulate matter from the secondary chamber that have been subjected to burning in the secondary chamber that is located in the rear of the secondary chamber and extends through the refractory lining 43 and the steel shell 44. The exhaust stack 13 is connected to the secondary chamber exhaust port 47 for receiving gases and particulate matter that have been subjected to burning in the secondary chamber and for conducting the gases and particulate matter away from the secondary chamber. The exhaust stack burner 31 for causing the burning of the gases and particulate matter that are received from the secondary chamber is connected to the lower end of the exhaust stack so that any gases and particulate matter that enter the exhaust stack come in close contact with the flame produced by the exhaust stack burner.

To practice this invention the secondary burner 25 is ignited and the interior of the secondary chamber 12 is brought up to a satisfactory operating temperature as indicated on the secondary chamber pyrometer 30 and this temperature is controlled by means of the fuel supply valve 28 and the air supply valve 29 that control the supply of air and fuel to the secondary chamber burner. For satisfactory operation, the temperature within the secondary chamber 12 must be above about 2,000° F. After this satisfactory temperature is achieved, the loading door 14 of the primary chamber 11 is opened and a charge of photographic waste is inserted into the confined area of the primary chamber through the loading port 38 and is placed on the bottom of the inner refractory lining 36. Care must be taken to insure that the photographic wastes do not cover the primary burners 17. Combustion air is then injected into the primary chamber 11 through the tuyere air holes 40. The primary burners 17 are then ignited and this causes ignition of the photographic wastes that are located within the first confined area of the primary chamber. The primary chamber 11 is brought up to a satisfactory operating temperature by means of the fuel control valve 20, the air control valve 24 and the primary chamber pyrometer 16. A proper operating temperature is achieved when the temperature of the gases and particulate matter that result from the burning of the photographic wastes that are near the primary chamber outlet port 41 is between about 1200° F. and about 1500° F. After this operating temperature has been reached, the primary burners 17 are shut off and the photographic waste is permitted to continue burning in the confined area of the primary chamber by means of the air that is being injected into the primary chamber through the tuyere air holes 40. After the primary burners have been shut off, the burning of the photographic wastes in the first confined area of the primary chamber 11 is controlled so that the temperature of the gases and particulate matter, resulting from the burning of the photographic wastes, that are near the primary chamber outlet port 41 is below about 1500° F. as they are about to leave the first confined area. For best results, the burning of the photographic wastes in the first confined area of the primary chamber is controlled so that the temperature of the gases and particulate matter, resulting from the burning of the photographic wastes, that are near the primary chamber outlet port 41 should be below about 1500° F. but above about 1200° F. as they are about to leave the first confined area of primary chamber 11. Proper temperature control is achieved by means of the primary chamber pyrometer 16 and the air control valve 24 that controls the amount of air supplied to the primary chamber. In controlling the temperature in the primary chamber 11, generally the amount of air injected into the primary chamber is increased to obtain an increase in the temperature or the amount of injected air is reduced if a lower temperature is desired.

During the burning of the photographic wastes in the primary chamber 11, the gases and particulate matter resulting from the burning of the photographic wastes are directed through the primary chamber exhaust port 41, through the secondary chamber inlet port 45 to the second confined area formed by the secondary chamber 12. The gases and particulate matter in the second confined area are subjected to burning at a temperature above about 2000° F. by means of the secondary burner 25. Proper temperature control of the gases and particulate matter in the secondary chamber 12 is achieved by means of the secondary chamber pyrometer 30, the fuel supply valve 28, and the air supply valve 29. The gases and particulate matter that have been subjected to burning and any gaseous products or particulate matter resulting from the burning of these gases and particulate matter are then directed out of the second confined area of the secondary chamber through the secondary chamber outlet port 47 to a suitable disposal system. If further burning of these gases and particulate matter is desired to further reduce the possibility of air pollution, then the gases and particulate matter that have been subjected to burning in the second confined area of the secondary chamber and any gaseous products or particulate matter resulting from the burning of these gases and particulate matter are directed to the exhaust stack 13 or some other similar third confined area and these gases and particulate matter that have been directed to the third confined area are subjected to burning at a temperature above about 2500° F. by means of the exhaust stack burner 31. The resulting gases and any remaining particulate matter can then be vented to the atmosphere or to a suitable disposal system. The gases that result from the burning of photographic wastes by the apparatus and method of this invention are substantially free of pollutants.

After the photographic wastes have been burned, the air-flow through the tuyere holes 40 can be used to cool down the primary chamber 11 and the remaining residual silver and silver-bearing ash if desired. The remaining silver and silver-bearing ash are removed from the first confined area of the primary chamber 11 through the ash removal port 39 after the photographic wastes in the first confined area formed by the primary chamber have been burned.

The types of photographic wastes that can be processed by the apparatus and method of this invention include all types of exposed and unexposed film that contain silver and other silver-bearing photographic wastes that are in a non-liquid state that permits them to be burned.

The invention may be more fully understood by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

Example 1

This example illustrates the rendering of silver from photographic wastes through the use of the method of this invention. After igniting the secondary chamber burner and bringing the temperature within the secondary chamber up to an operating temperature above about 2000° F., 800 lbs. of exposed X-ray film having an unknown silver content was placed within a refractory lined cylindrical primary chamber having an interior diameter of approximately four feet and an interior volume of approximately 75 cubic feet of a silver rendering apparatus similar to that previously described. Air was then fed into the primary chamber through the tuyere air holes and the primary burners were ignited. After approximately two and one-half hours the primary chamber pyrometer indicated that the temperature of the gases and particulate matter resulting from the ignited X-ray film that were near the primary chamber outlet port had a temperature between about 1200° F. and about 1500° F. The primary chamber burners were then turned off and the X-ray film was permitted to burn for eight hours while the temperature of the gases and particulate matter near the primary chamber outlet port as they were about to leave the primary chamber was kept within about 1200° F. and about 1500° F. by controlling the amount of air injected into the tuyere air holes. After this time, the film was completely burned and air was injected into the primary chamber through the tuyere air holes until the temperature indicated by the pyrometer was less than about 160° F. The remaining residual silver and silver-bearing ash was then removed from the primary chamber through the ash removal port. An analysis of this residual silver and silver-bearing ash indicated that it had a silver content of approximately 1.4% of the initial weight of the X-ray film. This residual silver and silver-bearing ash was then processed by conventional techniques of melting, settling and skimming in a crucible in a suitable gas and air furnace. The resulting processed silver was 99.7% pure silver.

Example 2

In this example silver was recovered from photographic wastes using apparatus described in Example 1. After ignition of the secondary chamber burner, a total of approximately 50,000 lbs. of assorted types of photographic film having an unknown silver content were subject to processing in 800 lb. loads. Ignition by the primary chamber burners continued for an average of three hours for all of the loads. After igniting each load, the primary burners were then cut off and the film was allowed to burn for eight hours while the temperature of the gases and particulate matter near the outlet port of the primary chamber was kept within about 1200° F. and about 1500° F. as the gases and particulate matter were about to leave the primary chamber by controlling the amount of air injected into the tuyere air holes. The remaining residual silver and silver-bearing ash was then cooled as described in Example 1 until the temperature indicated by the pyrometer was less than about 160° F. The resulting silver and silver-bearing ash had a purity of 25.8% by weight. The silver and silver-bearing ash were then separately processed by electrolytic refining methods.

During the ignition and burning of the waste film, the gases leaving the stack of the silver recovery apparatus were monitored and there was virtually no smoke and the density of the emitted smoke and gases was less than that indicated by the Ringleman No. 1 Scale. Therefore, the emitted gases and particulate matter met the requirement of Executive Order 11282 on Air Pollution that requires that the density of any emission to the atmosphere must not exceed that indicated by the Ringleman Scale No. 1. The gases and particulate matter leaving the secondary chamber during ignition and burning were also collected and the solid matter present was found to be less than the maximum of 0.3 grain of solid matter per cubic foot of flue gas permitted by Executive Order 11282.

Although the invention has been described in considerable detail with reference to certain preferred embodiments, it will be understood that variations and modifications may be made within the spirit and scope of the invention as defined in the appended claims.

What is claimed is:

1. A method of rendering silver from silver bearing photographic wastes comprising igniting said silver bearing photographic wastes in a first confined area, controlling the burning of said silver bearing photographic wastes in said first confined area so that the temperature of the gases and particulate matter resulting from the burning of said silver bearing photographic wastes is below about 1500° F. and above about 1200° F. as said gases and particulate matter are about to leave said first confined area by controlling the amount of air injected into said first confined area, directing said gases and particulate matter resulting from the burning of said silver bearing photographic wastes to a second confined area, subjecting said gases and particulate matter in said second confined area to burning at a temperature above about 2000° F., cooling said first confined area and the residual silver and silver-bearing ash remaining after said photographic wastes have been burned by injecting air into said first confined area, and removing the remaining silver and silver bearing ash from said first confined area after said silver bearing photographic wastes in said first confined area have been cooled.

2. The method of rendering silver from silver bearing photographic wastes of claim 1 including the steps of directing said gases and particulate matter that have been subjected to burning in said second confined area to a third confined area and subjecting said gases and particulate matter that have been directed to said third confined area to burning at a temperature above about 2500° F.

References Cited

UNITED STATES PATENTS

| | | | |
|---|---|---|---|
| 2,131,072 | 9/1938 | Reid | 75—83 |
| 2,218,250 | 10/1940 | Reid | 75—83 |
| 2,944,886 | 7/1960 | Fisher et al. | 75—63 X |
| 2,965,051 | 12/1960 | Kocee | 110—8 A X |
| 3,051,100 | 8/1962 | Singleton | 23—2 C |
| 3,219,418 | 11/1965 | Whitmire | 23—2 C X |
| 3,322,508 | 5/1967 | Ungerleider | 23—2 C X |
| 3,355,254 | 11/1967 | Hoskinson | 110—8 A X |
| 3,408,167 | 10/1968 | Burden | 23—2 C X |

HENRY W. TARRING II, Primary Examiner

U.S. Cl. X.R.

75—63